United States Patent [19]
Batten

[11] Patent Number: 5,595,393
[45] Date of Patent: Jan. 21, 1997

[54] INFANT CAR SEAT STROLLER CONVERSION AND METHOD THEREFOR

[76] Inventor: James B. Batten, 9 Anderson Avenue, St. John's, Newfoundland, Canada, A1B 3E3

[21] Appl. No.: 291,033

[22] Filed: Aug. 15, 1994

[51] Int. Cl.$^6$ .................................................. B62B 7/12
[52] U.S. Cl. ..................... 280/30; 280/643; 280/47.371; 280/43.1
[58] Field of Search ............................ 280/30, 643, 43.1, 280/648, 47.371, 37, 649, 642, 47.41, 650, 658, 43.14, 43.17, 43.24; 297/250, 397, 191

[56] References Cited

U.S. PATENT DOCUMENTS

| | | | |
|---|---|---|---|
| 2,781,225 | 2/1957 | Heideman | 280/648 |
| 4,537,414 | 8/1985 | Nusbaum | 280/47.41 |
| 4,685,688 | 8/1987 | Edwards | 280/30 |
| 4,878,680 | 11/1989 | Molnar | 280/30 |
| 4,896,894 | 1/1990 | Singletary | 280/30 |
| 4,987,888 | 2/1991 | Qureshi et al. | 280/30 |

*Primary Examiner*—Richard M. Camby
*Attorney, Agent, or Firm*—Millen, White, Zelano & Branigan, P.C.

[57] ABSTRACT

A car seat/stroller has a rigid tubular telescoping handle assembly and wheel bracket assembly which are fitted thereto in a manner which does not interfere with normal operation of the device as a car safety seat, but rather enhances the seat's safety and convenience. The handle assembly consists of a series of telescoping sections of tubing. Two holes are drilled at a diagonal angle into an infant car seat at respective top corners of the seat's sides, and further through respective flares at armrest portions of the seat. A tubular sleeve is inserted into each hole and is fed through to an underside of the flare. A clamping adjustment device is then affixed to one or both tubular sleeves at an upper portion thereof. Tubular L-shaped upper handle members are inserted into the tubular sleeves. The tubular L-shaped upper handle members are joined via a connecting tube having tensioning wires, each of which is fastened at a first end to an end stop in the connecting tube and at a second end to a second end stop in the tubular L-shaped upper handle member. A flat bar bracket having a first set of wheels thereon is affixed to a bottom portion of the seat in a manner whereby the wheels extend just below the lowermost portion of the seat and do not extend substantially beyond the outer periphery of the seat's housing. A retractable pivoting support on the car seat's bottom portion is modified by drilling a hole therethrough and inserting an axle on which a secondary set of wheels is mounted.

17 Claims, 2 Drawing Sheets

INFANT CAR SEAT STROLLER CONVERSION AND METHOD THEREFOR

BACKGROUND OF THE INVENTION

1. Field of the Invention

The invention relates in general to infant safety seats for use in automobiles, and in particular to a conversion for transforming an infant car seat into a car seat/stroller.

2. Related Art

Infant car seats which are suitable for use as strollers are known. However, these devices have heretofore been complex in nature, have required a difficult conversion from one configuration to the next, and/or have not provided a means for easily and inexpensively transforming a "production" car seat into a car seat/stroller combination. Further, the prior art features allowing an infant car seat to function as a stroller have been obtrusive in nature and have hindered, rather than enhanced, the operation and safety of the seat when used as a car seat.

U.S. Pat. No. 4,685,688 to Edwards teaches a stroller with retractable telescoping legs and handles which unlock and fold forward into a position wherein they are interlocked with the retracted legs so that the seat may be placed in an automobile. Two distinct configurations are necessary for operation of the seat in stroller mode and car seat mode, respectively. Operation of the folding and interlocking handles and legs can be difficult, especially where the operator has the additional responsibility of handling the child. Further, the design of the stroller/car seat of Edwards does not lend itself to modification of a production car seat to yield the disclosed device.

SUMMARY OF THE INVENTION

It is therefore an object of the invention to provide an infant car seat stroller conversion which may utilize a production car seat as the foundation therefor.

It is a further object of the invention to provide an infant car seat/stroller wherein the features permitting stroller operation are unobtrusive and do not interfere with operation of the device as a car seat.

It is a further object of the invention to provide a car seat stroller conversion with improved safety features over infant car seats not having such a conversion added thereto.

It is a further object of the invention to provide an infant car seat/stroller in which the steps required for transforming the device from car seat to stroller, or vice versa, are few or none.

In a preferred embodiment, the invention provides a car seat/stroller having a rigid tubular telescoping handle assembly and wheel bracket assembly which are fitted thereto in a manner which does not interfere with normal operation of the device as a car safety seat, but rather enhances the seat's safety and convenience. The handle assembly functions as an effective roll bar by virtue of its series of telescoping sections of tubing, said tubing preferably being comprised of highly rigid chromed steel.

Two holes are drilled at a diagonal angle into an infant car seat at respective top corners of the seat's sides, and further through respective flares at armrest portions of the seat. A tubular sleeve is inserted into each hole and is fed through to an underside of the flare. A self-tapping screw is inserted through each of the rigid flares and into a lower portion of each of the tubular sleeves, thereby securing the tubular sleeves in place. A clamping adjustment device is then affixed to one or both tubular sleeves at an upper portion thereof. Tubular L-shaped upper handle members, each having an outer diameter which is smaller than the inner diameter of said tubular sleeves, are inserted into the tubular sleeves, via one or both of said adjustment pensioners. The tubular L-shaped upper handle members are joined via a connecting tube to form a Au-shaped handle. The connecting tube is held in place by tensioning wires, each of which is fastened at a first end to an end stop in the connecting tube, runs through the connecting tube, an L-shaped upper handle member, and a tubular sleeve, and is fastened at a second end to a second end stop in the tubular L-shaped upper handle member.

A flat bar bracket having a first set of wheels thereon is affixed to a bottom portion of the seat in a manner whereby the wheels extend just below the lowermost portion of the seat and do not extend substantially beyond the outer periphery of the seat's housing. The flat bar bracket provides increased side-impact crush-resistance. A retractable pivoting support leg on the car seat's bottom portion is modified by drilling a hole therethrough and inserting an axle on which a secondary set of wheels is mounted.

The car seat/stroller according to the invention can be removed from an automobile in a like manner as a conventional car seat, with no folding or adjustments required. The stroller may be pulled beside the operator with the child facing rearward; such operation provides increased mobility, and capability to negotiate curbs and other obstacles, as compared to conventional "push" strollers. If the secondary set of wheels is not employed on the pivoting support, the pivoting support functions as a brake and stabilizer when the car seat/stroller is resting in a stationary manner, and can function as a pivot point when the car seat/stroller is being turned.

The device according to the invention also provides advantages over prior art devices when used in circumstances such as bus, train, or airline travel; by virtue of it's slim design, the device of the invention can be placed on a narrow seat without obstruction by wheel assemblies.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating principles of the invention.

DETAILED DESCRIPTION OF THE DRAWINGS

Figure 1:
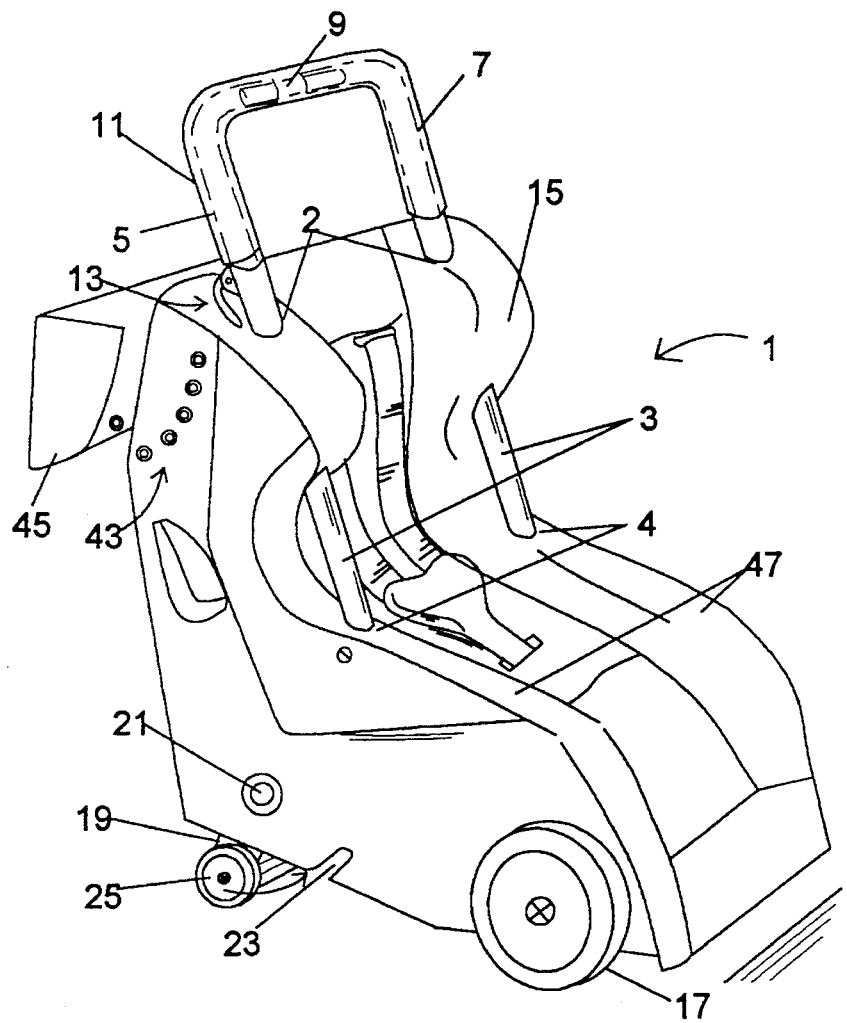
FIG. 1 is a perspective view illustrating certain principle features of the invention according to a preferred embodiment.

As illustrated in FIG. 1, the invention according to a preferred embodiment provides a car seat/stroller 1 which may utilize a production car seat as the foundation therefor by fitting a rigid tubular handle assembly and wheel assemblies to the production seat. The handle assembly consists of a series of telescoping sections of tubing, the tubing preferably being comprised of highly rigid chromed steel. Two holes are drilled at a diagonal angle into an infant car seat at respective top corners 2 of the seat's sides, and further through generally horizontal surfaces 4 of respective flares 47 at armrest portions of the seat.

Tubular sleeves 3 are inserted into each of the respective sets of holes 2, 4 and are fed through to an underside of the flares 47. Tubular sleeves 3 preferably comprise ⅝" inside diameter chromed tubing. A self-tapping screw is inserted through each of the rigid flares 47 and into a lower portion of each of the tubular sleeves 3, thereby securing the tubular sleeves in place. A clamping adjustment device 13 is then affixed to one or both tubular sleeves at an upper portion thereof.

Tubular L-shaped upper handle members 5, 7, each having an outer diameter which is smaller than the inner diameter of the tubular sleeves 3, are inserted into the tubular sleeves 3, one of the L-shaped upper handle members being first inserted through the clamping adjustment device 13. The Tubular L-shaped upper handle members 5, 7, preferably comprise 9/16" outside diameter chromed tubing. The tubular L-shaped upper handle members are joined via a connecting tube 9 to form a U-shaped handle. A flexible grip sleeve 11 may be fitted around the U-shaped hand to provide a uniform, cushioned gripping surface.

Figure 2:
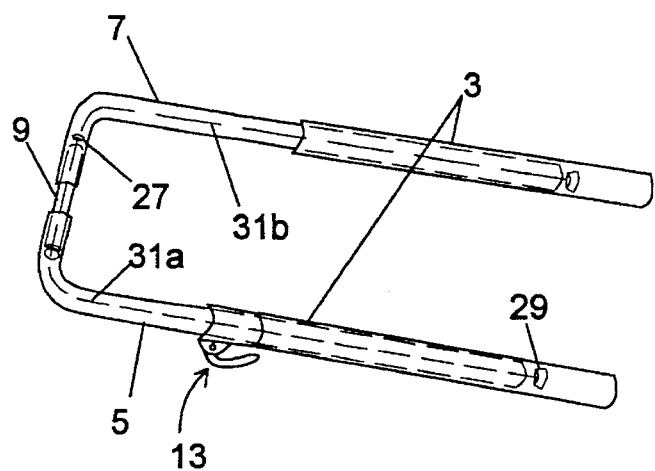
FIG. 2 is a perspective view illustrating certain details of the handle assembly according to a preferred embodiment of the invention.

Reference is now made to FIG. 2, which shows the handle assembly with the flexible grip sleeve removed for purposes of illustration. The connecting tube 9 is held in place by two tensioning wires 31a and 31b. The tensioning wire 31a is fastened at a first end to a first end stop 27 in the connecting tube, runs through the connecting tube 9, through the L-shaped upper handle member 5, through the lower one of the tubular sleeves 3, and is fastened at a second end to a second end stop 29 in that tubular sleeve. Tensioning wire 31b runs a similar path on the opposite side of the handle assembly. The upper portion of the handle assembly can be raised or lowered by loosening the clamping adjustment device 13, sliding the tubular L-shaped upper handle members 5, 7, with respect to the tubular sleeves 3, and re-tightening the clamping adjustment device 13 to lock the handle in position.

The upper portion of the handle assembly provides the car seat/stroller with increased safety over an unmodified car seat in that the handle effectively functions as a roll bar, providing added crush-resistance to the car seat. The telescoping nature of the tubular L-shaped upper handle members 5, 7, with respect to the tubular sleeves 3 adds increased rigidity to the handle assembly, thereby further increasing crush-resistance.

Many production infant car seats feature a retractable pivoting support 19, FIG. 1, which can be modified to receive an axle for a secondary set of wheels, one of which is shown at 25. In a raised position, the pivoting support 19 is flush with the bottom plane of the infant car seat's housing. When swung into the lowered position, as shown in FIG. 1, the pivoting support 19 extends downward from the bottom plane and locks in position. A release button 21 is used to unlock the pivoting support and permit it to swing back up into the seat's housing. The retractable pivoting support 19 is modified by drilling a hole therethrough and inserting an axle on which the secondary set of wheels is mounted at respective ends. Two flat washers separated by a ⅜" inside diameter spacer tube are placed onto the axle prior to mounting of the wheels to prevent contacting of the pivoting support by the wheels. A slot 23 is cut into the housing to receive the spacer tube when the pivoting support is swung into the raised position. Thus modified, the pivoting support can be swung down to enable a user to push the device of the invention like a conventional stroller. As set forth in more detail below, it may be advantageous to pull the device of the invention without the use of the secondary wheels, using only the primary wheels 17.

A series of female snaps 43 are mounted along the upper back of the seat body and continue around to and up both sides for a distance of approximately ten inches to points approximately three inches from the top of the sides. A flexible sack 45 of cloth, vinyl, leather, or other suitable material having male snaps thereon can then be attached via the snaps and serves as a carrier pouch to hold objects such as travel necessities, etc.

Figure 3:
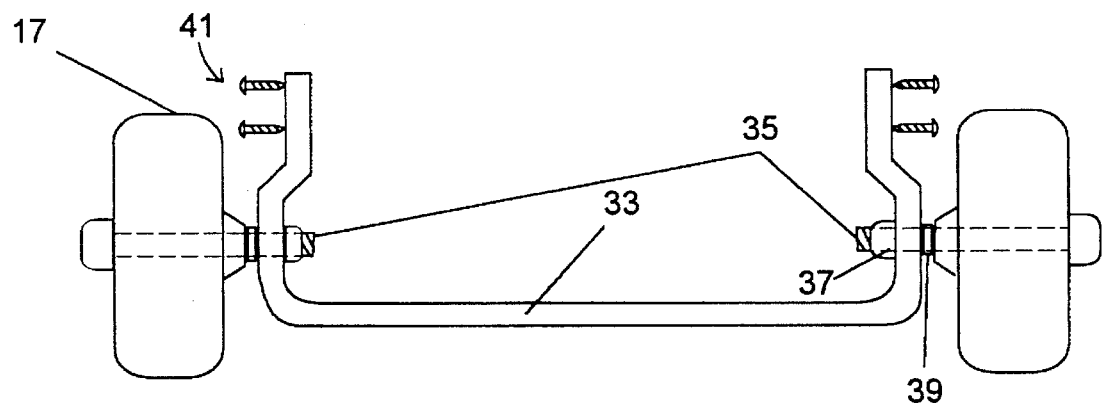
FIG. 3 is a fragmentary elevational view of the wheel bracket assembly according to a preferred embodiment of the invention.

FIG. 3 illustrates the flat bar bracket having a set of primary wheels 17 thereon which is affixed to a bottom portion of the seat by self-tapping screws 41 in a manner whereby the wheels extend just below the lowermost portion of the seat; when the seat is placed in an automobile, the wheels may be positioned to extend over the edge of the automobile's seat such that they do not interfere with normal operation of the car seat/stroller in its capacity as a car seat. The bracket receives axle bolts 35, which are inserted through holes in each vertical side of the bracket. Each axle bolt extends through a hub of a wheel 17, through a washer 39, and through the vertical side of the bracket 33. Each bolt is secured by a nut 37 affixed to a portion of the bolt extending through the inside face of the bracket 33. The bracket 33, when mounted to the car seat's housing, contributes additional side-impact crush-resistance to the seat.

The car seat/stroller according to the invention can be removed from an automobile in a like manner as a conventional car seat, with no folding or adjustments required. If desired, the height of the handle may be adjusted to suit the particular operator. The stroller may be pulled beside the operator with the child facing rearward; such operation does not require the use of a secondary set of wheels connected to pivoting support 19. Such operation provides increased mobility, and capability to negotiate curbs and other obstacles, as compared to conventional "push" strollers. If the secondary set of wheels is not employed on the pivoting support 19, the pivoting support functions as a brake and stabilizer when the car seat/stroller is resting in a stationary manner, and can function as a pivot point when the car seat/stroller is being turned. The invention provides safety features, such as the impact resistance discussed above, which are not normally associated with strollers but which substantially improve safety when the invention is used outside the car as a stroller.

The device according to the invention also provides advantages over prior art devices when used in circumstances such as bus, train, or airline travel; the device of the invention can be placed on a narrow seat by virtue of it's slim design. Wheels 17 do not extend substantially beyond the outer periphery of flare 47 and extend only slightly below the bottom of the housing, thereby permitting placement of the device on a seat without obstruction by wheel assemblies. By virtue of the wheels extending only slightly below the housing, the device is given a low center of gravity for greater stability as compared to conventional strollers.

While the invention has been particularly shown and described with reference to a preferred embodiment thereof, it will be understood by those skilled in the art that various changes in form and details may be made therein without departing from the spirit and scope of the invention.

The embodiments of the invention in which an exclusive property or privilege is claimed are defined as follows:

1. A child car safety seat and stroller useful for transporting a child with increased safety in an automobile and for aiding in transporting said child along a surface outside said automobile, comprising:

a seat structure having a recessed area for receiving a child;

means for securing said seat structure to a seating surface of said automobile;

first and second passages in said seat structure extending in a generally downward direction from an upper portion of said seat structure;

a handle assembly having at least two elongated projections, each of said projections extending downward through respective ones of said first and second passages;

means for securing said handle assembly to said seat structure; and, wheel mounting means, having at least one rotatable wheel mounted thereon, attached to a lower portion of said seat structure at a forward position, whereby said at least one rotatable wheel is in a fixed position except for its rotatability, in relation to said seat structure, and whereby lifting of a rearward portion of said seat structure via said handle assembly affects a shift of a majority of the weight of said seat structure to said at least one rotatable wheel so as to permit said seat structure to be rolled along said surface.

2. The child car safety seat and stroller according to claim 1, wherein said handle assembly comprises a series of telescoping tubular members.

3. The child car safety seat and stroller according to claim 2, wherein said series of telescoping tubular members comprises:

at least one tubular upper handle member for forming a U-shaped handle;

first and second tubular sleeves inserted into respective ones of said first and second passages in said seat structure for receiving respective prongs of said U-shaped handle; and, securing means for securing said prongs of said U-shaped handle within respective ones of said tubular sleeves.

4. The child car safety seat and stroller according to claim 3, wherein said securing means comprises a clamping adjustment means for securing said prongs of said U-shaped handle in a locked position within respective ones of said tubular sleeves and for releasing said U-shaped handle from said locked position so as to permit said U-shaped handle to be extended or lowered.

5. The child car safety seat and stroller according to claim 3, wherein said at least one tubular upper handle member comprises:

two L-shaped tubular members, of said at least one tubular upper handle member being in telescoping relation with a connecting tube, whereby said U-shaped handle is formed; and fastening means for fastening said L-shaped tubular members and said connecting tube in said telescoping relation.

6. The child car safety seat and stroller according to claim 5, wherein said fastening means comprises:

a first stop means positioned at an end portion of said connecting tube;

a second stop means positioned at an end portion of one of said L-shaped tubular members; and, a wire means fastened at a first end to said first stop means and fastened at a second end to said second stop means.

7. The child car safety seat and stroller according to claim 1, further comprising:

a retractable support leg means for providing a pivot point around which said seat structure can be pivoted.

8. The child car safety seat and stroller according to claim 7, further comprising:

at least one secondary rotatable wheel means attached to said retractable support leg means via a second axle means.

9. The child car safety seat and stroller according to claim 8, further comprising:

at least one slot in said seat structure for receiving a portion of said second axle means which extends beyond a side of said seat structure when said retractable support leg is retracted.

10. The child car safety seat and stroller according to claim 1, further comprising:

fastening means extending at least along a vertical back portion of said seat structure for receiving a portion of flexible material, thereby forming a pouch for containing personal articles.

11. The child car safety seat and stroller according to claim 10, wherein said fastening means comprises a series of snaps extending from a first vertical side of said seat structure along said vertical back portion of said seat structure, and terminating along a second vertical side of said seat structure.

12. The child car safety seat and stroller according to claim 2, further comprising securing means for securing said series of telescoping tubular members of said handle assembly in any telescoped or non-telescoped position.

13. The child car safety seat and stroller according to claim 12, wherein said securing means comprise a clamping adjustment means for securing said telescoping tubular members.

14. The child car safety seat and stroller according to claim 1, wherein said at least one rotatable wheel is in a fixed position extending below the lowermost portion of the seat to a minimum extent necessary to allow rolling of the seat on said wheel.

15. The child car safety seat and stroller according to claim 1, having a wheel or wheels only at a forward position thereof.

16. A child car safety seat and stroller useful for transporting a child with increased safety in an automobile and for aiding in transporting said child along a surface outside said automobile, comprising:

a seat structure having a recessed area for receiving a child;

means for securing said seat structure to a seating surface of said automobile;

first and second passages extending in a generally downward direction from an upper portion of said seat structure;

a handle assembly having at least two elongated projections, each of said projections extending downward through respective ones of said first and second passages;

means for securing said handle assembly to said seat structure; and, wheel mounting means, having at least one rotatable wheel mounted thereon, attached to a lower portion of said seat structure at a forward position, whereby lifting of a rearward portion of said seat structure via said handle assembly affects a shift of a majority of the weight of said seat structure to said at least one rotatable wheel so as to permit said seat structure to be rolled along said surface;

wherein said handle assembly comprises a series of telescoping tubular members having at least one tubular upper handle member for forming a U-shaped handle;

first and second tubular sleeves inserted into respective ones of said first and second passages in said seat structure for receiving respective prongs of said U-shaped handle; and, securing means for securing said prongs of said U-shaped handle within respective ones of said tubular sleeves.

17. A child car safety seat and stroller useful for transporting a child with increased safety in an automobile and for aiding in transporting said child along a surface outside said automobile, comprising:

a seat structure having a recessed area for receiving a child;

means for securing said seat structure to a seating surface of said automobile;

first and second passages extending in a generally downward direction from an upper portion of said seat structure;

a handle assembly having at least two elongated projections, each of said projections extending downward through respective ones of said first and second passages;

means for securing said handle assembly to said seat structure; and, wheel mounting means, having at least one rotatable wheel mounted thereon, attached to a lower portion of said seat structure at a forward position, whereby lifting of a rearward portion of said seat structure via said handle assembly affects a shift of a majority of the weight of said seat structure to said at least one rotatable wheel so as to permit said seat structure to be rolled along said surface;

a retractable support leg means for providing a pivot point around which said seat structure can be pivoted;

at least one secondary rotatable wheel means attached to said retractable support leg means via a second axle means; and at least one slot in said seat structure for receiving a portion of said second axle means which extends beyond a side of said seat structure when said retractable support leg is retracted.

* * * * *